United States Patent
Yoshitomi

(10) Patent No.: US 12,311,875 B2
(45) Date of Patent: May 27, 2025

(54) SADDLE-RIDE TYPE VEHICLE

(71) Applicant: HONDA MOTOR CO., LTD., Tokyo (JP)

(72) Inventor: Hiroki Yoshitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 18/247,355

(22) PCT Filed: Jul. 15, 2021

(86) PCT No.: PCT/JP2021/026666
§ 371 (c)(1),
(2) Date: Mar. 30, 2023

(87) PCT Pub. No.: WO2022/074895
PCT Pub. Date: Apr. 14, 2022

(65) Prior Publication Data
US 2023/0391411 A1    Dec. 7, 2023

(30) Foreign Application Priority Data
Oct. 5, 2020    (JP) ................................ 2020-168673

(51) Int. Cl.
*B60R 25/02*    (2013.01)
*B62H 5/04*    (2006.01)
(Continued)

(52) U.S. Cl.
CPC .............. *B60R 25/02* (2013.01); *B62H 5/04* (2013.01); *E05B 71/00* (2013.01); *E05B 79/02* (2013.01);
(Continued)

(58) Field of Classification Search
CPC ...... E05B 19/0082; E05B 49/00; E05B 71/00; E05B 79/00; E05B 79/02; E05B 83/00;
(Continued)

(56) References Cited

U.S. PATENT DOCUMENTS

| | | | |
|---|---|---|---|
| 6,257,031 B1 * | 7/2001 | Misner | B60R 25/2063 70/252 |
| 6,734,578 B2 * | 5/2004 | Konno | B60R 25/02 70/237 |

(Continued)

FOREIGN PATENT DOCUMENTS

| | | | | |
|---|---|---|---|---|
| DE | 602004011161 T2 * | 1/2009 | | B60R 25/02 |
| DE | 10115314 B4 * | 12/2011 | | B62H 5/00 |

(Continued)

OTHER PUBLICATIONS

International Preliminary Report on Patentability corresponding to Application No. PCT/JP2021/026666, dated Mar. 28, 2023, 5 pages.
(Continued)

*Primary Examiner* — Christopher J Boswell
(74) *Attorney, Agent, or Firm* — Rankin, Hill & Clark LLP

(57) ABSTRACT

A structure that enables response with consideration to emergencies in a saddle-ride type vehicle including an electronic key authentication system. The saddle-ride type vehicle includes a smart lock module that enables a start operation for an engine and an unlocking operation for a handlebar and enables unlocking of a seat and a fuel lid, through an electronic key authentication system; and a vehicle body cover disposed around the smart lock module. The smart lock module includes an insertion portion into which an emergency release key that allows the seat to be unlocked in an emergency is inserted. The insertion portion is located in the smart lock module to the vehicle rear side.

12 Claims, 14 Drawing Sheets

(51) Int. Cl.
  *E05B 71/00* (2006.01)
  *E05B 79/02* (2014.01)
  *E05B 81/12* (2014.01)
  *E05B 81/90* (2014.01)
  *E05B 83/00* (2014.01)
  *E05B 19/00* (2006.01)

(52) U.S. Cl.
  CPC .............. *E05B 81/12* (2013.01); *E05B 81/90* (2013.01); *E05B 83/00* (2013.01); *E05B 19/0082* (2013.01)

(58) Field of Classification Search
  CPC .......... E05B 85/01; E05B 85/02; E05B 81/04; E05B 81/12; E05B 81/14; E05B 81/16; E05B 81/24; E05B 81/25; E05B 81/56; E05B 81/62; E05B 81/90; B62H 5/04; B60R 25/02; B60R 25/24; B60R 25/248
  See application file for complete search history.

(56) References Cited

U.S. PATENT DOCUMENTS

| | | | | |
|---|---|---|---|---|
| 7,071,819 | B2 * | 7/2006 | Konno | B60R 25/24 340/432 |
| 7,196,612 | B2 * | 3/2007 | Sumada | E05B 83/16 340/427 |
| 7,369,035 | B2 * | 5/2008 | Konno | B60R 25/246 340/5.72 |
| 8,040,225 | B2 * | 10/2011 | Nakamura | B60R 25/24 340/5.72 |
| 10,801,234 | B2 * | 10/2020 | Takeuchi | E05B 41/00 |
| 2004/0090306 | A1 | 5/2004 | Konno et al. | |
| 2007/0247280 | A1 | 10/2007 | Nakamura | |
| 2015/0203071 | A1 | 7/2015 | Kinoshita et al. | |

FOREIGN PATENT DOCUMENTS

| | | | | |
|---|---|---|---|---|
| EP | 1088951 | A2 * | 4/2001 | B62H 5/04 |
| EP | 1669264 | A1 * | 6/2006 | B60R 25/04 |
| JP | 2004-114838 | A | 4/2004 | |
| JP | 2007-276635 | A | 10/2007 | |
| JP | 6101218 | B2 | 3/2017 | |
| WO | WO-2008081965 | A1 * | 7/2008 | B62H 5/02 |

OTHER PUBLICATIONS

Indonesian Office Action dated Dec. 4, 2024 issued in corresponding Indonesian application No. P00202302917; English translation included (6 pages).
International Search Report, International Application No. PCT/JP2021/026666, Date of mailing: Sep. 7, 2021, 2 pages.
Written Opinion of the International Searching Authority dated Sep. 7, 2021 filed in PCT/JP2021/026666, 3 pages.

* cited by examiner

SADDLE-RIDE TYPE VEHICLE

TECHNICAL FIELD

The present invention relates to a saddle-ride type vehicle.

BACKGROUND ART

There have been known saddle-ride type vehicles including an electronic key authentication system that performs electronic authentication between an electronic key carried by an occupant and a control unit provided in the vehicle (see, for example, Patent Literature 1).

The electronic key authentication system includes a smart lock module that enables starting of an engine, locking and unlocking of a handlebar, and unlocking of a seat and a fuel lid, below the handlebar in the front of the vehicle body. The smart lock module includes a key cylinder that allows manual release of the seat lock using an emergency key in the event of an emergency when power is not supplied from the battery.

A magnet key is provided at the tip of the emergency key. In order to rotate the key cylinder with the magnet key, the emergency key is inserted into a key insertion opening, which is exposed to the outside by removing a vehicle body cover located to the side of the smart lock module, more specifically, a cover member constituting part of the vehicle body cover, and the magnet key is inserted into a key insertion hole that is provided in the key cylinder.

The key insertion opening is formed in the vehicle body cover, and the key insertion hole is oriented lateral to the vehicle. The direction (front-rear direction) in which the emergency key is inserted into the key insertion opening is orthogonal to the direction (vehicle width direction) in which the magnet key is inserted into the key insertion hole.

CITATION LIST

Patent Literature

Patent Literature 1: Japanese Patent No. 6101218

SUMMARY OF INVENTION

Technical Problem

In Patent Literature 1, it is necessary to remove part of the vehicle body cover when using the emergency key, and even if the vehicle body cover is removed, the key insertion hole is not exposed to the outside. A structure in which more consideration is given to emergency response is desired.

An object of the present invention is to provide a structure that enables response with consideration to emergencies in a saddle-ride type vehicle including an electronic key authentication system.

Solution to Problem

The present specification includes all the contents of Japanese Patent Application No. 2020-168673 filed on Oct. 5, 2020.

A saddle-ride type vehicle includes a smart lock module that enables a start operation for an engine and an unlocking operation for a handlebar and enables unlocking of a seat and a fuel lid, through an electronic key authentication system, and a vehicle body cover disposed around the smart lock module, and is characterized in that the smart lock module includes an insertion portion into which an emergency release key that allows the seat to be unlocked in an emergency is inserted, and the insertion portion is located in the smart lock module to a vehicle rear side.

The above configuration may further include a sub cover that is provided separately from the vehicle body cover so as to surround the smart lock module and disposed closer to the smart lock module than the vehicle body cover when viewed from the seat side. The sub cover may cover the insertion portion.

In addition, in the above configuration, an opening that surrounds the insertion portion may be provided in the sub cover, the sub cover may include an insertion portion cover that is removable, the insertion portion cover closing the opening and covering the insertion portion, and an operation portion that is operated when opening the insertion portion cover from the sub cover may be provided in the insertion portion cover.

In addition, in the above configuration, the sub cover may be disposed in front of the seat and have a shape protruding rearward at a placement location of the smart lock module in a vehicle width direction.

In addition, in the above configuration, the insertion portion may be oriented toward the rear of the vehicle.

In addition, in the above configuration, the sub cover may include a pair of ribs that protrude upward in regions located on both sides of the smart lock module.

Advantageous Effects of Invention

A saddle-ride type vehicle includes a smart lock module that enables a start operation for an engine and an unlocking operation for a handlebar and enables unlocking of a seat and a fuel lid, through an electronic key authentication system, and a vehicle body cover disposed around the smart lock module. The smart lock module includes an insertion portion into which an emergency release key that allows the seat to be unlocked in an emergency is inserted, and the insertion portion is located in the smart lock module to a vehicle rear side. With this configuration, since the insertion portion is located in the smart lock module to the vehicle rear side, accessibility to the insertion portion can be improved relative to the case where the insertion portion is provided in the smart lock module to the vehicle lateral side.

The above configuration may further include a sub cover that is provided separately from the vehicle body cover so as to surround the smart lock module and disposed closer to the smart lock module than the vehicle body cover when viewed from the seat side. The sub cover may cover the insertion portion. With this configuration, the insertion portion can be protected by the sub cover while ensuring accessibility to the insertion portion from the seat side in an emergency.

In addition, in the above configuration, an opening that surrounds the insertion portion may be provided in the sub cover, the sub cover may include an insertion portion cover that is removable, the insertion portion cover closing the opening and covering the insertion portion, and an operation portion that is operated when opening the insertion portion cover from the sub cover may be provided in the insertion portion cover. With this configuration, the operation portion can be accessed without removing the large vehicle body cover or sub cover, and the insertion portion can be exposed to the outside for confirmation by removing the insertion portion cover without removing the sub cover.

In addition, in the above configuration, the sub cover may be disposed in front of the seat and have a shape protruding rearward at a placement location of the smart lock module in a vehicle width direction. With this configuration, since the smart lock module is provided in the region in front of the seat where the sub cover protrudes rearward, the distance between the seat and the insertion portion can be shortened, and the emergency release key can be inserted more easily.

In addition, in the above configuration, the insertion portion may be oriented toward the rear of the vehicle. With this configuration, since the insertion portion is oriented toward the seat side, the insertion portion can be easily seen from the seat side, and the seat and the insertion portion can be brought closer to each other than in the case where the insertion portion is oriented outward in the vehicle width direction.

In addition, in the above configuration, the sub cover may include a pair of ribs that protrude upward in regions located on both sides of the smart lock module. With this configuration, the smart lock module can be protected by the left and right ribs, and the rigidity of the sub cover can be improved by the ribs.

DESCRIPTION OF EMBODIMENTS

Hereinafter, embodiments of the present invention will be described with reference to the drawings. Note that, in the description, directions such as front, rear, left, right, up, and down are the same as directions with respect to a vehicle body unless otherwise specified. In addition, in each of the drawings, reference symbol FR denotes the front direction of the vehicle body, reference symbol UP denotes the upper direction of the vehicle body, and reference symbol LH denotes the left direction of the vehicle body.

First Embodiment

Figure 1:
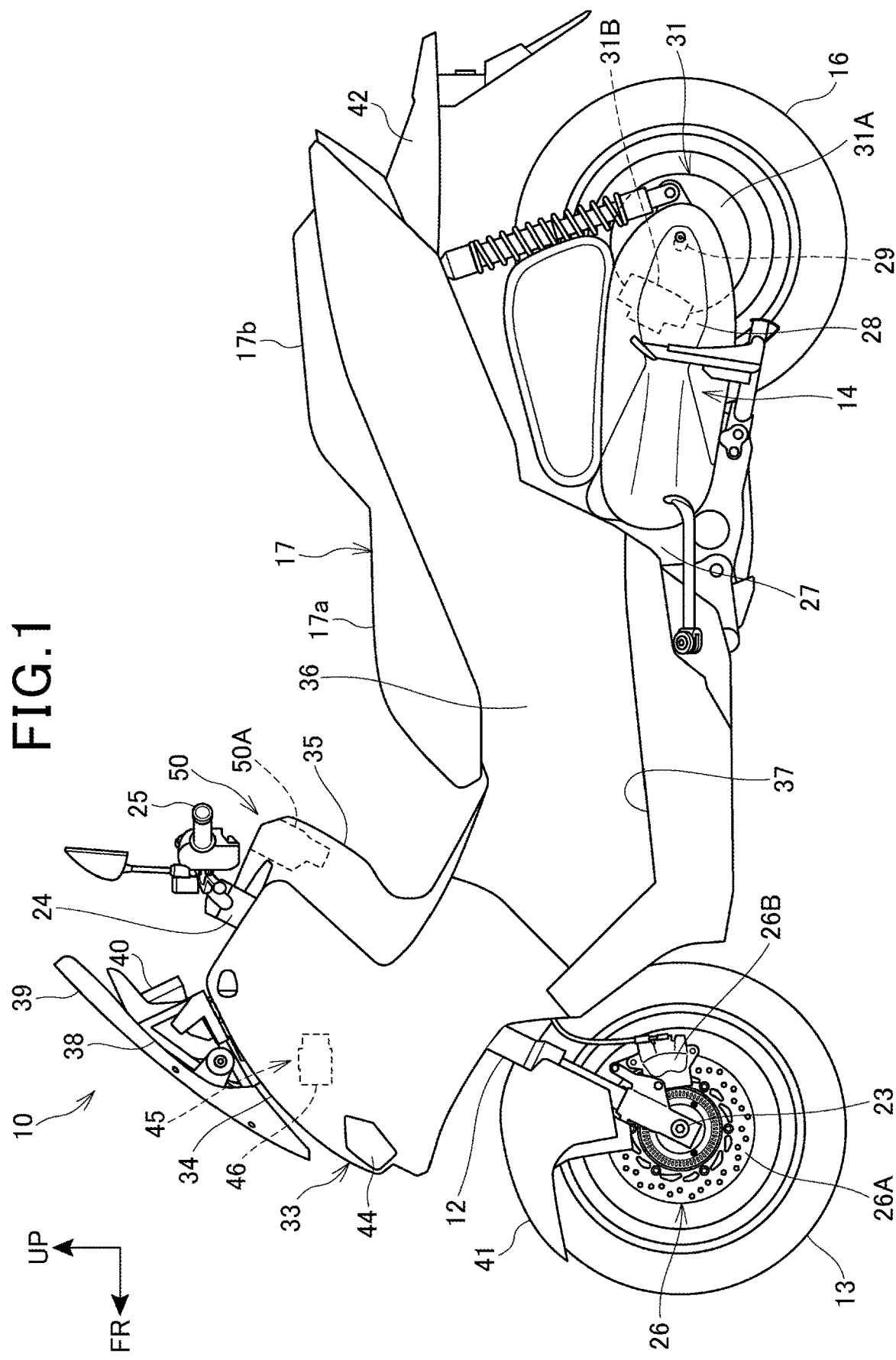
FIG. 1 is a left side view illustrating a motorcycle according to a first embodiment of the present invention.

FIG. 1 is a left side view illustrating a motorcycle 10 according to a first embodiment of the present invention.

In the motorcycle 10, a front wheel 13 is supported at a front end of a vehicle body frame 11 (see FIG. 10) via a front fork 12, a rear wheel 16 is supported at a lower portion of the vehicle body frame 11 via a power unit 14, and a seat 17 is disposed at an upper portion of the vehicle body.

The motorcycle 10 is a scooter, saddle-ride type vehicle in which an occupant sits astride the seat 17.

The front fork 12 is supported by a head pipe 21 (see FIG. 2), which constitutes the front end of the vehicle body frame 11, so as to be rotatable to the left and right. The front wheel 13 is supported at a lower end of the front fork 12 via an axle 23, and a handlebar 25 is supported at an upper end of the front fork 12 via a pair of left and right handlebar holders 24.

A front-wheel brake device 26 is attached to the front wheel 13, and the front wheel 13 is braked by the front-wheel brake device 26.

The front-wheel brake device 26 includes a brake disc 26A mounted to the front wheel 13 and a brake caliper 26B mounted to a lower portion of the front fork 12. The brake caliper 26B is connected via piping to an ABS modulator 46 that is provided in a front portion of the vehicle body.

Brake fluid pressure is transmitted from the ABS modulator 46 to the brake caliper 26B in response to the operation force of a front-wheel brake lever provided on the handlebar 25, and the brake disc 26A is sandwiched between two brake pads by the brake fluid pressure to perform braking.

The power unit 14 includes an engine 27 that constitutes a front portion and a continuously variable transmission 28 that is provided integrally with a rear portion of the engine 27, and the rear wheel 16 is mounted to an output shaft 29 that is provided at a rear end of the continuously variable transmission 28. A rear-wheel brake device 31 is attached to the rear wheel 16, and the rear wheel 16 is braked by the rear-wheel brake device 31.

The vehicle body frame 11 is covered with a vehicle body cover 33.

The vehicle body cover 33 includes a front cover 34, a front inner cover 35 serving as a vehicle body cover, a pair of left and right body side covers 36, and a pair of left and right floor steps 37.

The front cover 34 covers the front portion of the vehicle body from the front and both sides. The front inner cover 35 covers an upper portion of the front fork 12 from behind and is connected to left and right rear edges of the front cover 34. The left and right body side covers 36 extend rearward from the left and right rear edges, respectively, of the front cover 34, below left and right side portions of the seat 17. The left and right floor steps 37 are provided below the left and right body side covers 36, and are portions on which the occupant places his/her feet.

A screen 39 supported by a screen stay 38 is disposed in front of an upper portion of the front cover 34. In addition, a meter 40 is mounted to a rear portion of the screen stay 38.

The front wheel 13 is covered with a front fender 41 from above, and the rear wheel 16 is covered with a rear fender 42 from above.

A pair of left and right headlights 44 are arranged at a lower portion of the front cover 34, and the ABS modulator 46 constituting an ABS 45 is disposed inside the front cover 34 behind the left and right headlights 44.

The ABS modulator 46 controls the braking of the front-wheel brake device 26 and the rear-wheel brake device 31 to prevent the front wheel 13 and the rear wheel 16 from locking during braking.

A smart lock module 50A is disposed inside an upper portion of the front inner cover 35.

The motorcycle 10 includes a smart key system 50 that performs electronic authentication between a smart key (not illustrated) that is an electronic key carried by the occupant and a control unit (not illustrated) provided in the vehicle body.

The smart lock module 50A constitutes part of the smart key system 50 serving as an electronic key authentication system, and can start/stop the engine 27, lock/unlock the handlebar 25, and unlock (release) the seat 17 and a fuel lid 72 (see FIG. 2) of a fuel tank 71 (see FIG. 2) from a closed and locked state.

Figure 2:
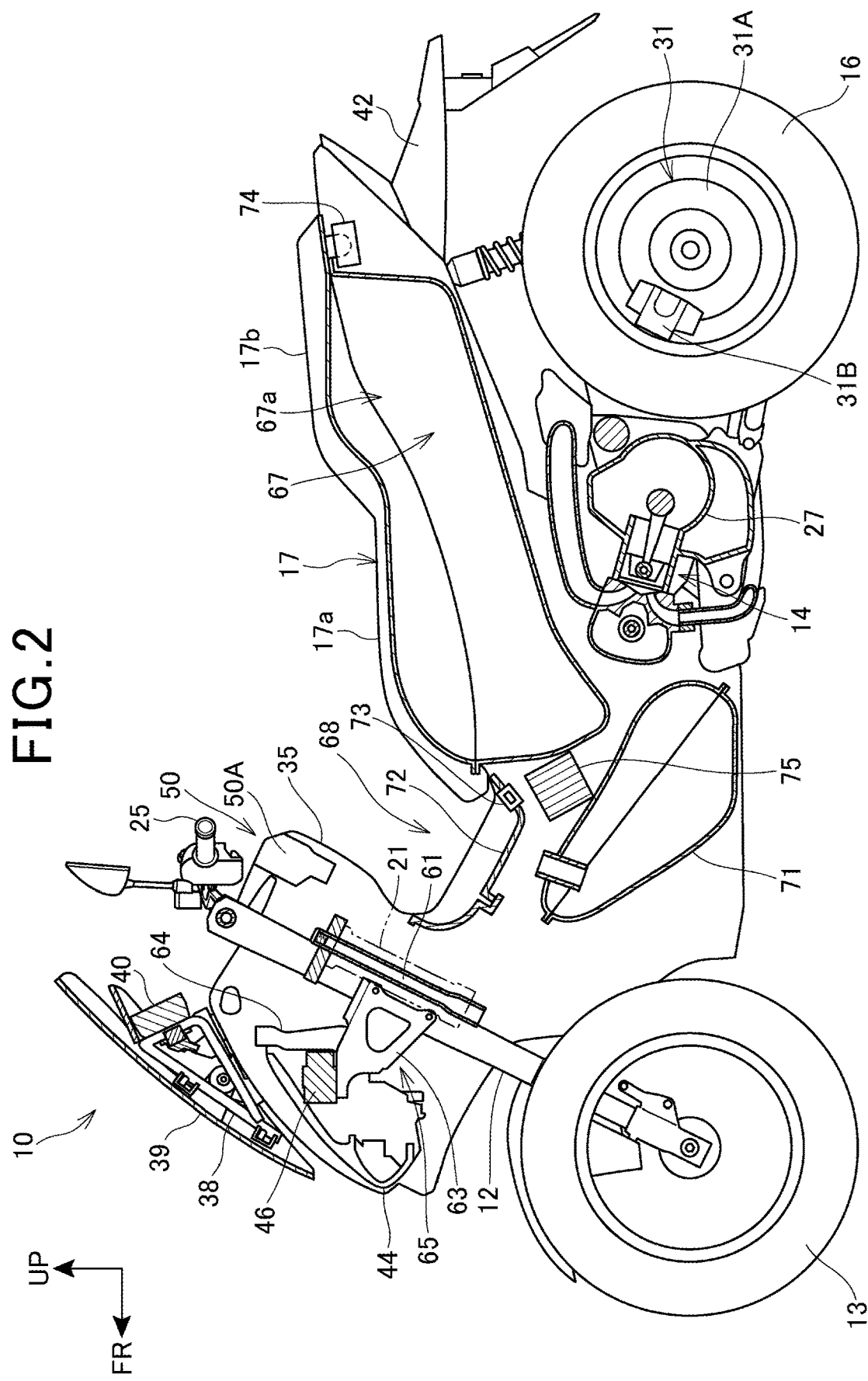
FIG. 2 is a sectional view illustrating the motorcycle.

FIG. 2 is a sectional view illustrating the motorcycle 10, and illustrates a longitudinal section taken along a vehicle body centerline that extends in the front-rear direction through the center of the motorcycle 10 in the vehicle width direction.

A steering stem 61 constituting the front fork 12 is rotatably supported by the head pipe 21.

A first stay 63 is mounted to a front portion of the head pipe 21 so as to extend forward, and the ABS modulator 46 is supported on an upper front portion of the first stay 63.

In addition, a second stay 64 extending vertically is mounted to an upper portion of the first stay 63, and a wire harness or the like is supported by the second stay 64.

The first stay 63 and the second stay 64 constitute a vehicle front stay 65.

The rear-wheel brake device 31 includes a brake disc 31A mounted to the rear wheel 16 and a brake caliper 31B mounted to a rear portion of the power unit 14. The brake caliper 31B is connected via piping to the ABS modulator 46.

Brake fluid pressure is transmitted from the ABS modulator 46 to the brake caliper 31B in response to the operation force of a rear-wheel brake lever provided to the handlebar 25, and the brake disc 31A is sandwiched between two brake pads by the brake fluid pressure to perform braking.

The motorcycle 10 includes a storage box 67 disposed below the seat 17, and the fuel tank 71 disposed below a foot-straddle space 68 that is formed between the front inner cover 35 and the seat 17.

The fuel lid 72 is locked in a closed state by a lid lock mechanism 73 that is provided at a front portion of the storage box 67. A battery 75 is disposed between the storage box 67 and the fuel tank 71.

The seat 17 integrally includes a rider seat 17a on which a rider sits and a passenger seat 17b on which a passenger sits. The storage box 67 is elongated in the front-rear direction over the lower side of the rider seat 17a and passenger seat 17b of the seat 17, and an opening 67a at an upper portion of the storage box 67 is covered with the seat 17 from above.

The seat 17 is mounted to a front end of the storage box 67 so as to be openable and closable via a hinge (not illustrated). A rear end of the seat 17 is locked by a seat lock mechanism 74 (see FIG. 2) that is provided at a rear portion of the vehicle body frame 11 (see FIG. 10).

Figure 3:
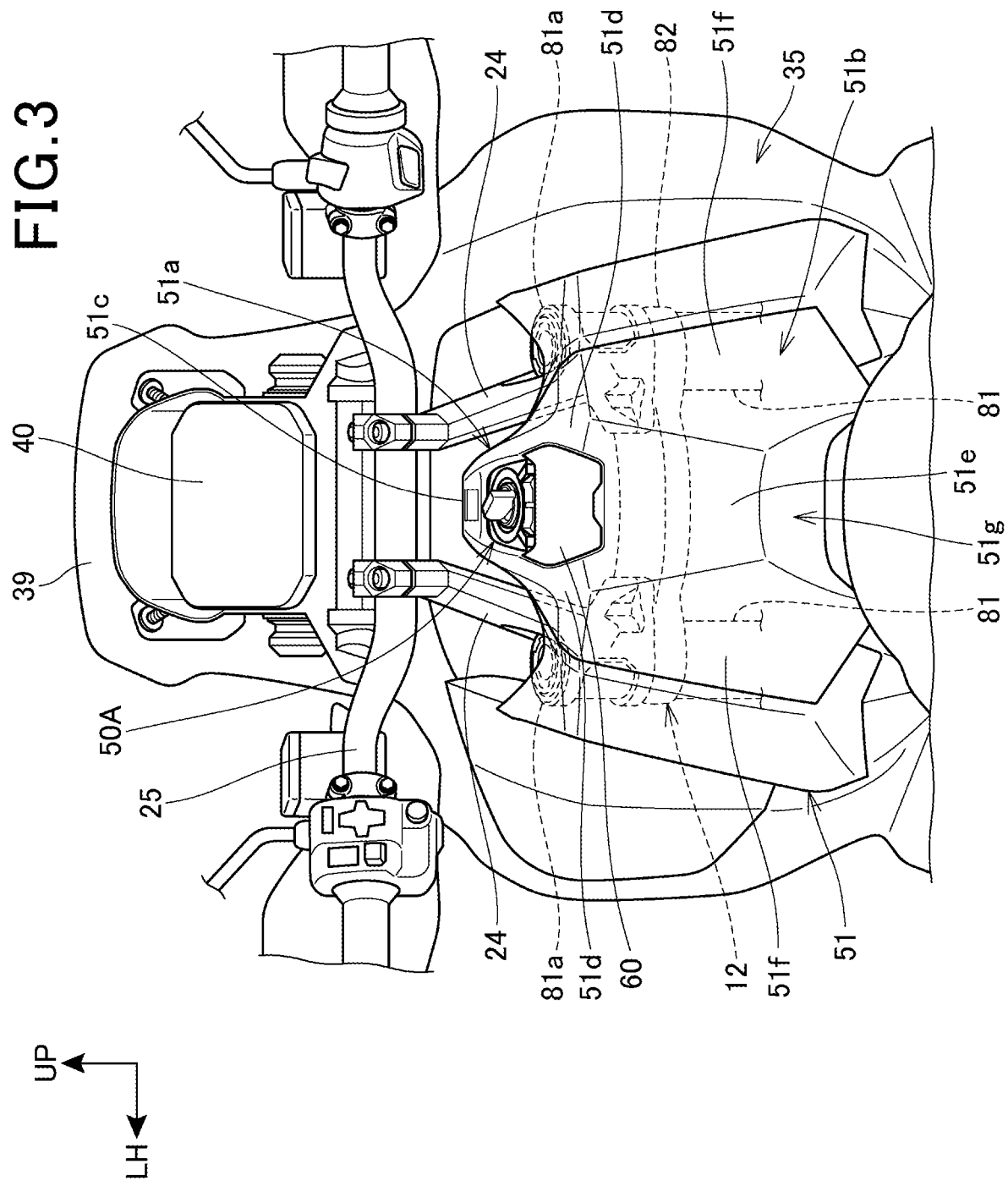
FIG. 3 is a rear view illustrating an upper front portion of a vehicle body.

FIG. 3 is a rear view illustrating an upper front portion of the vehicle body.

The front fork 12 includes a pair of left and right fork tubes 81 that are shock absorbers, and a top bridge 82 and a bottom bridge (not illustrated) that are coupling members for coupling the left and right fork tubes 81.

The handlebar holders 24 are mounted to upper ends of the left and right fork tubes 81, and the handlebar 25 is mounted to the left and right handlebar holders 24. In addition, the axle 23 (see FIG. 1) is mounted to lower ends of the left and right fork tubes 81.

The bottom bridge is spaced apart below the top bridge 82, and the steering stem 61 (see FIG. 2) is bridged in a vertically-extending manner between the top bridge 82 and the bottom bridge.

In the rear view, the smart lock module 50A is disposed between the handlebar 25 and the top bridge 82 and between upper ends 81a of the left and right fork tubes 81. In addition, in the rear view, the smart lock module 50A is disposed further inward in the vehicle width direction than upper ends (which support the handlebar 25) of the left and right handlebar holders 24.

A sub cover 51 that surrounds an upper portion of the smart lock module 50A is disposed below the handlebar 25 and on the upper portion of the front inner cover 35. The sub cover 51 is separate from the front inner cover 35.

The sub cover 51 includes a plurality of engagement portions (not illustrated) on the front surface, and the engagement portions engage with a plurality of engagement-receiving portions (not illustrated) formed on the front inner cover 35. Thus, the sub cover 51 is removably mounted to the front inner cover 35.

The sub cover 51 is integrally composed of a substantially flat upper cover portion 51a that surrounds the upper portion of the smart lock module 50A and a rear cover portion 51b that extends downward from a rear edge of the upper cover portion 51a.

The upper cover portion 51a includes an upper center portion 51c formed in a frame shape at the center in the vehicle width direction and a pair of left and right upper side portions 51d formed on both sides of the upper center portion 51c. The rear cover portion 51b includes a lower center portion 51e formed so as to protrude rearward at the center in the vehicle width direction, and a pair of left and right lower side portions 51f on both sides of the lower center portion 51e, which are positioned gradually forward from the lower center portion 51e toward the outside in the vehicle width direction. The above-described upper center portion 51c and lower center portion 51e form a center portion 51g in the vehicle width direction.

As described above, the sub cover 51 is positioned toward the rear of the vehicle as approaching the center portion 51g in the vehicle width direction from the outside in the vehicle width direction, and the smart lock module 50A is located at the center portion 51g (specifically, the upper center portion 51c) of the sub cover 51 in the vehicle width direction. The sub cover 51 includes the upper center portion 51c at the placement location of the smart lock module 50A in the vehicle width direction, and the lower center portion 51e behind the upper center portion 51c. Therefore, the sub cover 51 has a shape protruding rearward at the placement location of the smart lock module 50A in the vehicle width direction.

By placing the sub cover 51 having a relatively large area so as to overlap the upper portion of the front inner cover 35, the sub cover 51 can be disposed closer to the smart lock module 50A than the front inner cover 35 when the smart lock module 50A and the surroundings thereof are viewed from the vehicle rear side (seat 17 side) (rear view illustrated in FIG. 3), and variation can be given to the design of the periphery of the smart lock module 50A. Thus, the design of the front portion of the vehicle body can be improved. In addition, by removably mounting the sub cover 51 to the front inner cover 35, the ease of assembly of the sub cover 51 can be improved, and furthermore, the sub cover 51 can also be changed to one having a different shape or color.

Figure 4:
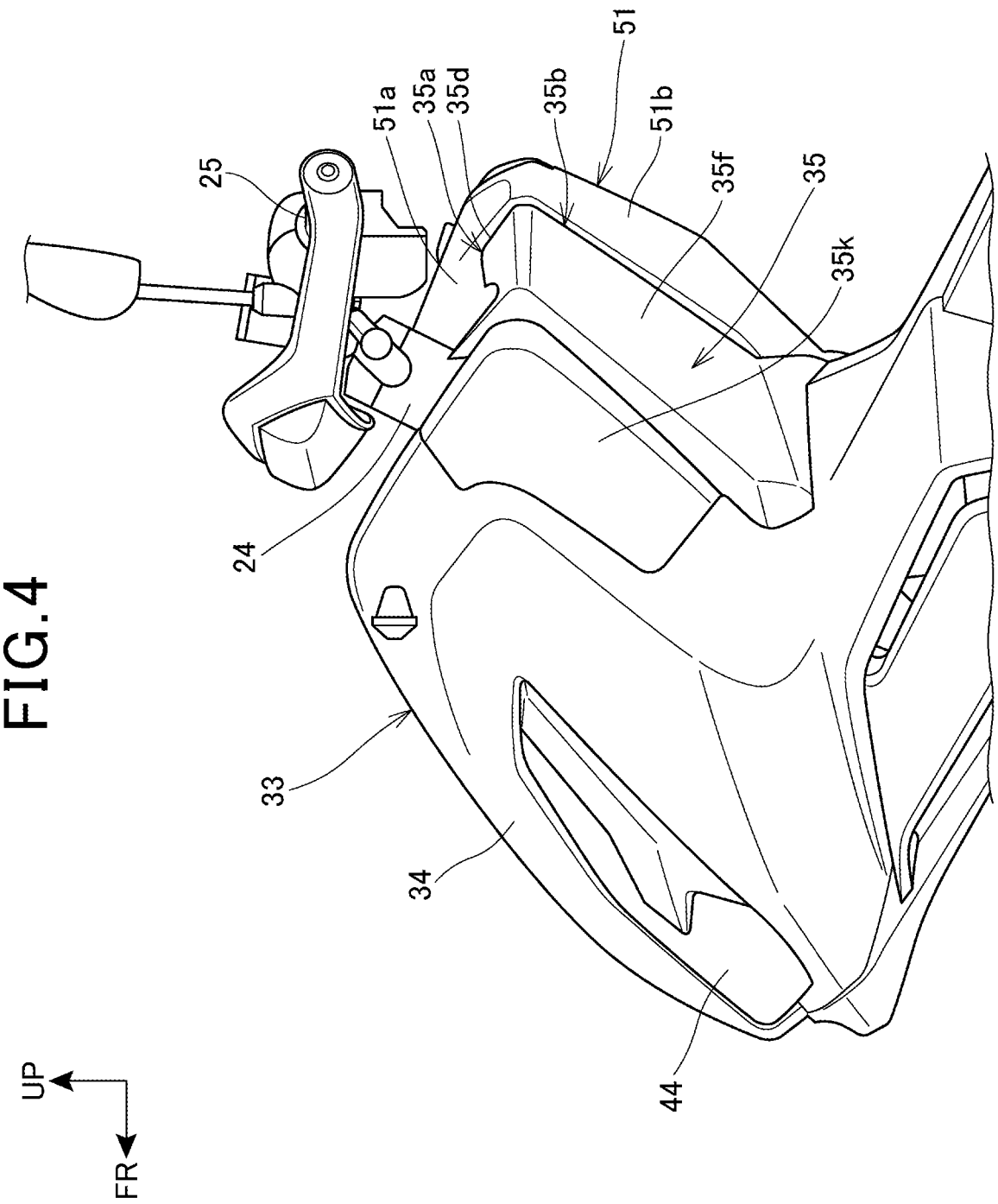
FIG. 4 is a left side view illustrating the upper front portion of the vehicle body.

FIG. 4 is a left side view illustrating the upper front portion of the vehicle body.

The sub cover 51 is formed in an L shape in the side view, and integrally includes the upper cover portion 51a mounted to an inner upper portion 35a (see also FIG. 9) of the front inner cover 35 and the rear cover portion 51b mounted to an inner lower portion 35b (see also FIG. 9) of the front inner cover 35.

The upper cover portion 51a is disposed so as to incline upwardly to the front and surrounds the upper portion of the smart lock module 50A (see FIG. 3). The rear cover portion 51b is disposed so as to incline upwardly to the rear, and forms part of the foot-straddle space 68 (see FIG. 2) located in front of the seat 17 (see FIG. 1).

A pair of left and right side surface portions 35k that integrally extend forward from both ends of an upper inner side portion 35d (see also FIG. 9) and lower inner side portion 35f (see also FIG. 9) of the front inner cover are provided. The left and right side surface portions are located below the handlebar 25 in the side view.

Figure 5:
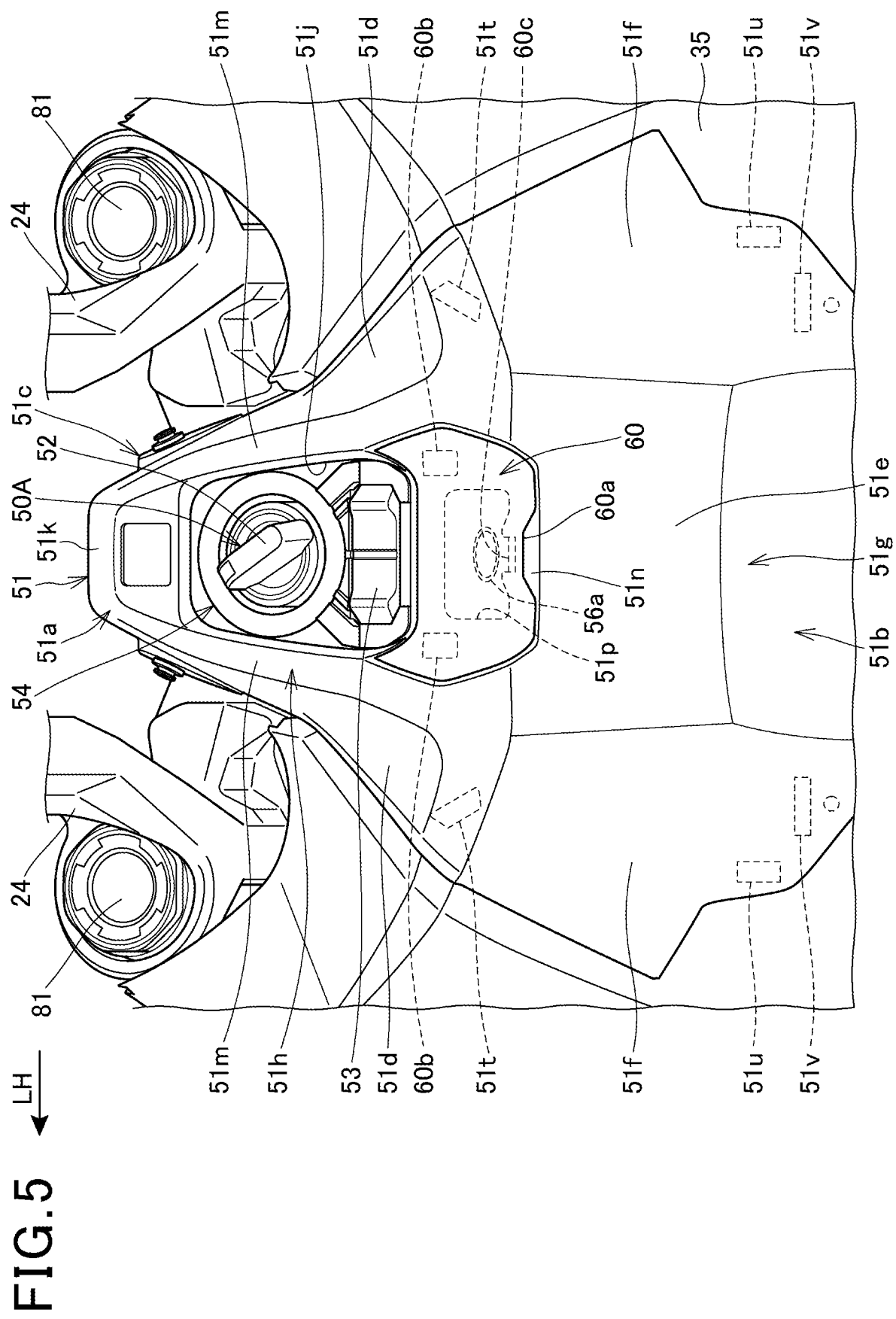
FIG. 5 is a perspective view illustrating a smart lock module and the surroundings thereof.

FIG. 5 is a perspective view illustrating the smart lock module 50A and the surroundings thereof.

The upper center portion 51c of the sub cover 51 includes a frame 51h that surrounds the smart lock module and an upper opening 51j that is formed inside the frame 51h so as to expose the upper portion of the smart lock module 50A.

The frame 51h is configured from a frame front end portion 51k that extends in the vehicle width direction and constitutes the front end, and a pair of left and right frame side portions 51m that extend so as to spread out rearward from left and right ends, respectively, of the frame front end portion 51k.

A cover attachment portion 51n that extends across the upper cover portion 51a and the rear cover portion 51b is provided to the sub cover 51 behind the left and right frame side portions 51m and the upper opening 51j. An opening 51p is formed in the cover attachment portion 51n, and a rear cover (insertion portion cover) 60 is removably mounted to the cover attachment portion 51n so as to cover the opening 51p.

The smart lock module 50A includes an ignition knob (first operating element) 52 and an unlocking knob (second operating element) 53 located behind the ignition knob 52. The ignition knob 52 and the unlocking knob 53 are provided on the upper portion of the smart lock module 50A, more specifically, an ignition switch unit 54, and are exposed through the upper opening 51j of the sub cover 51.

A cut-away portion (operation portion) 60a serving as the operation portion of the rear cover 60 is where a finger is hung when removing the rear cover 60 from the sub cover 51, and the rear cover 60 can be easily removed from the sub cover 51 by providing the cut-away portion 60a. Thus, the cut-away portion 60a can be accessed without removing the large front inner cover 35 or sub cover 51, and an insertion portion 56a can be exposed to the outside for confirmation by removing the rear cover 60 without removing the sub cover 51.

The frame front end portion 51k and the left and right frame side portions 51m are each formed in a rib shape that protrudes further upward than the inner portion of the frame 51h. The left and right frame side portions 51m are provided at left and right edges of the upper opening 51j so as to extend in the front-rear direction, increase the rigidity of an upper portion of the sub cover 51, and laterally protect the ignition knob 52 and the unlocking knob 53. As described above, the sub cover 51 also serves as a protective member that protects the smart lock module 50A.

A front portion of the frame 51h is disposed between the left and right handlebar holders 24.

The left and right handlebar holders 24 extend upward from the upper ends of the left and right fork tubes 81 while approaching each other inward in the vehicle width direction, and, in the vehicle width direction, become closer to the smart lock module 50A toward the top of the left and right handlebar holders 24. Thus, the ignition knob 52 and the unlocking knob 53 are laterally protected by the left and right handlebar holders 24.

Figure 6:
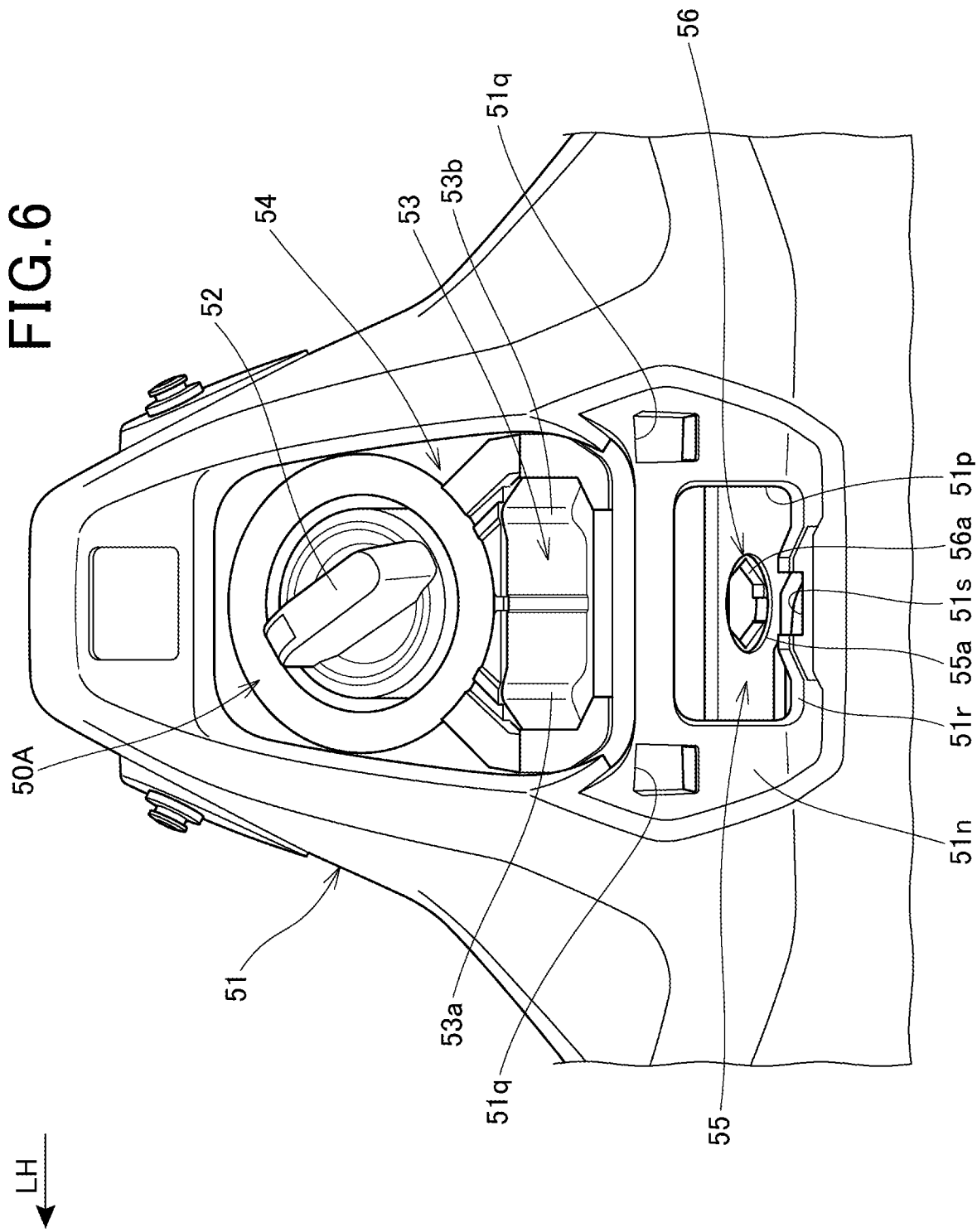
FIG. 6 is an enlarged perspective view with a rear cover removed from the state of FIG. 5.
Figure 7:
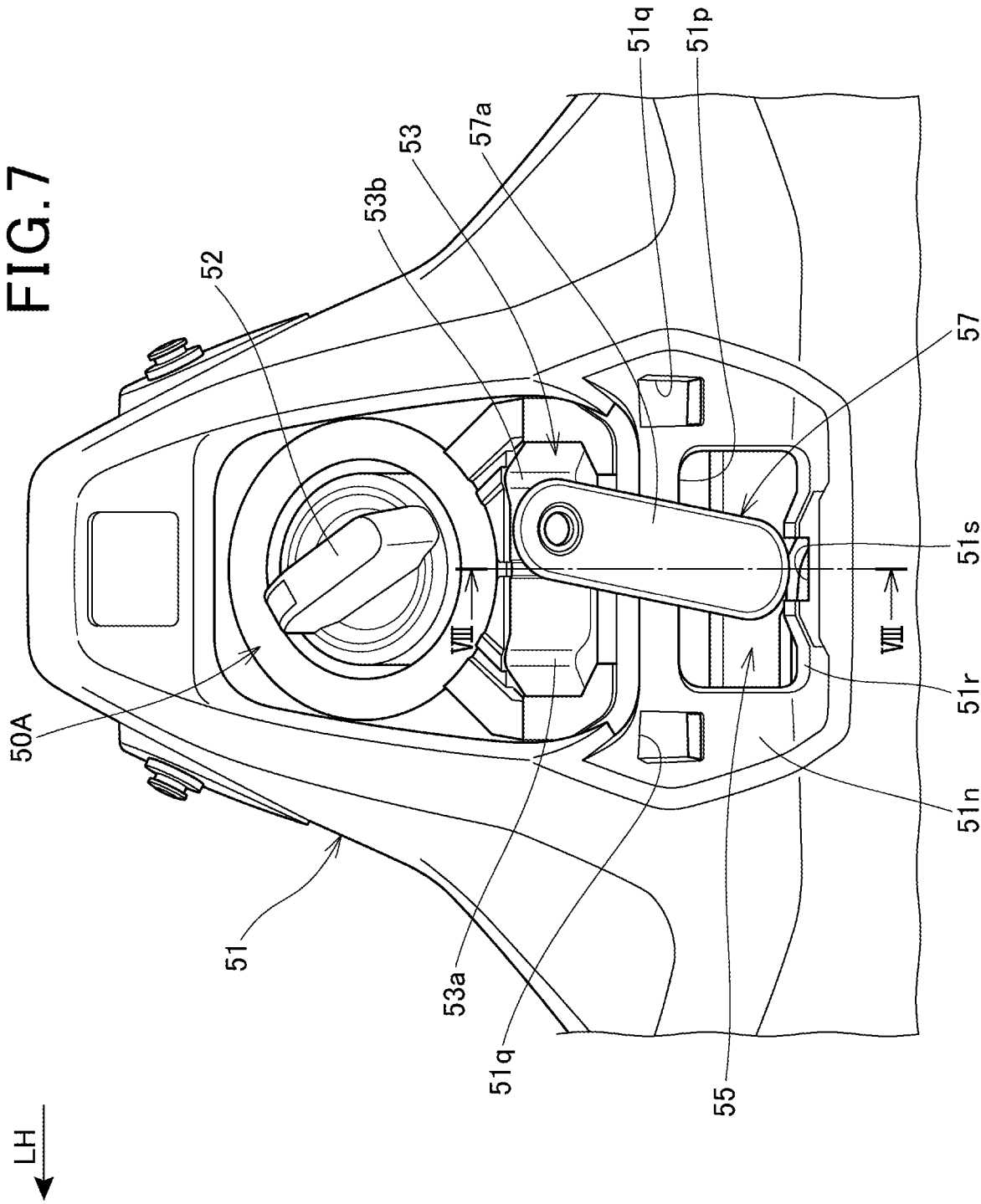
FIG. 7 is a perspective view illustrating a state in which an emergency release key is inserted into an insertion portion illustrated in FIG. 6.
Figure 8:
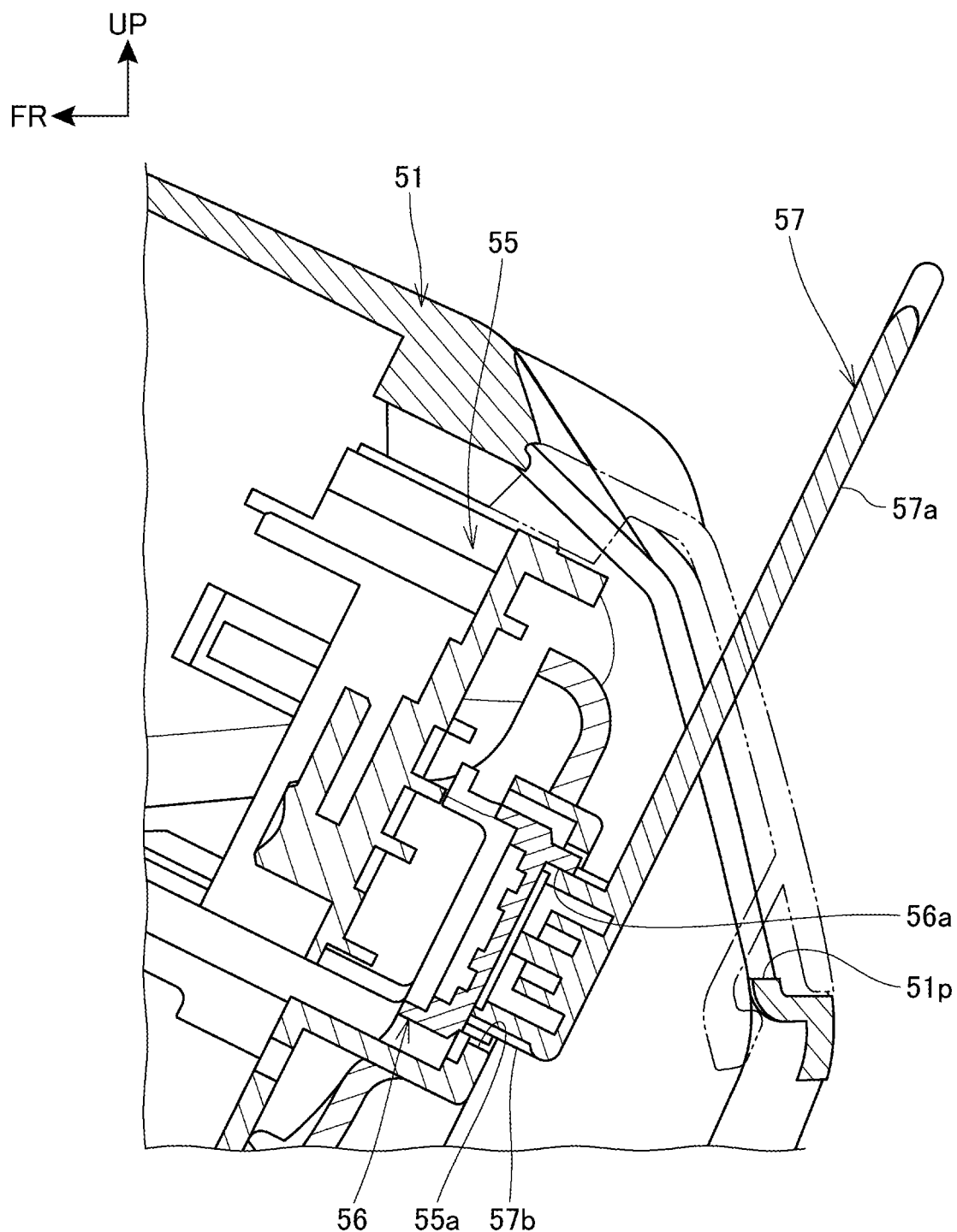
FIG. 8 is a sectional view taken along line VIII-VIII of FIG. 7.

FIG. 6 is an enlarged perspective view with the rear cover 60 removed from the state of FIG. 5, FIG. 7 is a perspective view illustrating a state where an emergency release key 57 is inserted into the insertion portion 56a illustrated in FIG. 6, and FIG. 8 is a sectional view taken along line VIII-VIII of FIG. 7.

As illustrated in FIG. 6, the sub cover 51 is formed with a pair of left and right engagement-receiving portions 51q, which are formed from holes, in an upper portion of the cover attachment portion 51n formed in a recessed shape. The opening 51p is disposed between the left and right engagement-receiving portions 51q. The opening 51p is formed in a substantially rectangular shape, and a cut-away engagement-receiving portion 51s opening upward is formed in the center of a lower edge 51r of the opening 51p in the vehicle width direction.

The left and right engagement-receiving portions 51q and the engagement-receiving portion 51s are engaged with a pair of left and right protruding engagement portions 60b (see FIG. 5) and a protruding engagement portion 60c (see FIG. 5) that are formed on the back surface of the rear cover 60 (see FIG. 5). Thus, the rear cover 60 is removably mounted to the sub cover 51.

The smart lock module 50A is configured from the ignition switch unit 54 that includes the ignition knob 52 and the unlocking knob 53, and a lid release unit 55 that is adjacent to the rear of the ignition switch unit 54.

The ignition knob 52 switches on-off of an ignition switch (power switch) and on-off of a handlebar lock. The ignition knob 52 also makes the unlocking knob 53 operable.

The seesaw unlocking knob 53 allows the seat 17 (see FIG. 1) to be unlocked and opened by pressing a left portion 53a, and the fuel lid 72 (see FIG. 2) to be unlocked and opened by pressing a right portion 53b.

In addition, the ignition switch unit 54 includes a lock mechanism (not illustrated) that uses a solenoid (not illustrated) to restrict the rotation of the ignition knob 52.

When the solenoid is not energized from the battery the ignition knob 52 is disabled from rotary operation by keeping a lock pin (not illustrated) engaged with the ignition knob 52. In addition, when the solenoid is energized from the battery 75, the lock pin is removed from the ignition knob 52, thereby allowing the ignition knob 52 to rotate.

The lid release unit 55 includes a key cylinder 56 that allows manual unlocking of the seat 17 in the event of an emergency, such as when power supply from the battery 75 is disabled.

The key cylinder 56 is provided at a rear end of the smart lock module 50A and includes the insertion portion 56a into which the emergency release key 57 (see FIG. 7) is inserted. The insertion portion 56a is formed in a recessed shape, and is exposed inside a key insertion opening 55a that is formed in the rear surface of the lid release unit 55.

Normally, the seat 17 (see FIG. 1) is unlocked by operating the smart lock module 50A. However, as described above, when the smart lock module 50A is not energized from the battery 75, the seat 17 can be unlocked by the emergency release key 57 without operating the ignition switch unit 54 of the smart lock module 50A. The emergency release key 57 is carried by the occupant together with a smart key.

The insertion portion 56a is rotatably provided in the key cylinder 56 and is oriented toward the rear of the vehicle. The emergency release key 57 is inserted into the insertion portion 56a from behind the key insertion opening through the key insertion opening 55a, and the seat 17 can be unlocked and opened by rotating the emergency release key 57 leftward or rightward.

As described above, the insertion portion 56a is located in a rear portion of the smart lock module 50A (vehicle rear side, i.e., rear portion with respect to the vehicle), the accessibility to the insertion portion 56a from the seat 17 can be improved relative to the case where the insertion portion is provided on the lateral side (lateral side with respect to the vehicle). In addition, since the lid release unit 55 including the insertion portion 56a is adjacent to the rear of the ignition switch unit 54, the access to the insertion portion 56a can be facilitated. Further, since the insertion portion 56a is oriented toward the rear of the vehicle and exposed through the opening 51p, the insertion portion 56a can be easily seen from the seat 17 side, and the seat 17 and the insertion portion 56a can be brought closer to each other than the case where the insertion portion 56a is oriented toward the side (outward in the vehicle width direction), so that the emergency release key 57 can be easily inserted from the rider seat 17a (see FIG. 1) side of the seat 17. In addition, since the insertion portion 56a is normally covered with the sub cover 51, the insertion portion 56a can be protected by the sub cover 51 while ensuring accessibility to the insertion portion 56a from the seat 17 side in an emergency.

As illustrated in FIGS. 7 and 8, the emergency release key 57 integrally includes a tabular lever portion 57a that is manually operated by the occupant and a key body portion 57b that is provided at the tip of the lever portion 57a.

The key body portion 57b, which protrudes from one surface of the lever portion 57a, is integrally engaged with the insertion portion 56a of the key cylinder 56 through the key insertion opening 55a of the lid release unit 55.

By rocking the lever portion 57a rightward or leftward and rotating the insertion portion 56a via the key body portion 57b, a seat lock cable 58 (see FIG. 10) connected to the insertion portion 56a side is pulled. Thus, the seat lock mechanism 74 (see FIG. 2) connected to the leading end of the seat lock cable 58 (see FIG. 10) is activated, and the coupling between the seat lock mechanism 74 side and the seat 17 (see FIG. 2) side is released. As a result, the seat lock is released, and the seat 17 can be opened.

Figure 9:
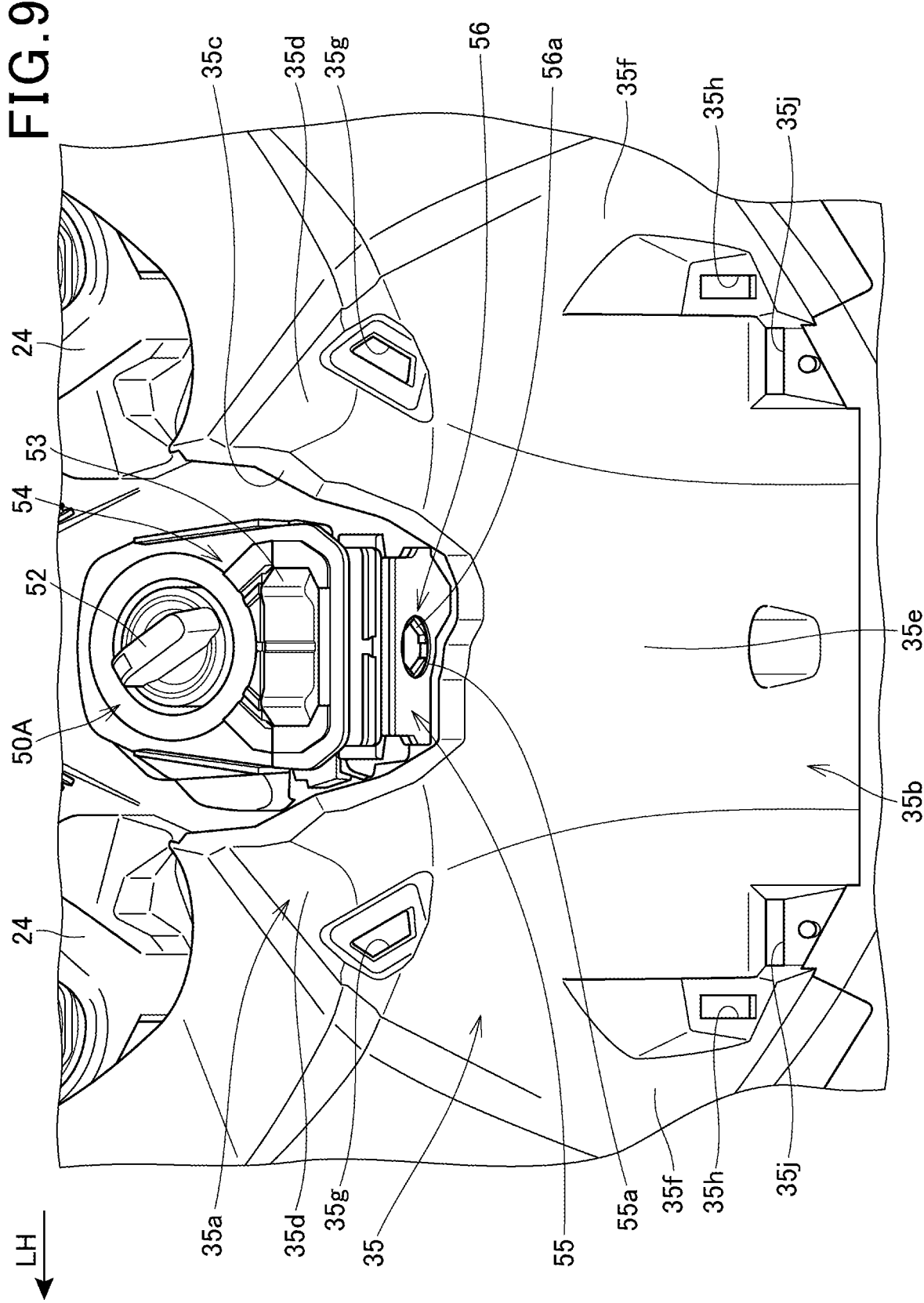
FIG. 9 is a perspective view with a sub cover removed from the state of FIG. 5.

FIG. 9 is a perspective view with the sub cover 51 removed from the state of FIG. 5.

The front inner cover 35 is integrally composed of the inner upper portion 35a formed substantially flat and the inner lower portion 35b extending downward from a lower edge of the inner upper portion 35a.

The inner upper portion 35a is formed from an upper-end cut-away portion 35c that is formed at the center of the inner upper portion 35a in the vehicle width direction so as to surround the smart lock module 50A, and the pair of left and right upper inner side portions 35d that are formed on the outside of the upper-end cut-away portion 35c in the vehicle width direction.

The inner lower portion 35b includes a lower inner center portion 35e that is located at the center in the vehicle width direction below the upper-end cut-away portion 35c, and the pair of left and right lower inner side portions 35f that are arranged on the outside of the lower inner center portion 35e in the vehicle width direction below the left and right upper inner side portions 35d.

The left and right lower inner side portions 35f extend from both edges of the lower inner center portion while inclining outward and obliquely forward in the vehicle width direction. That is, the lower inner center portion 35e protrudes further toward the rear of the vehicle than the left and right lower inner side portions 35f.

When the sub cover 51 is removed from the front inner cover 35, a plurality of hole-shaped cover engagement-receiving portions 35g, 35h, 35j which are provided in the front inner cover 35 so as to be engaged with the sub cover 51 are exposed.

The left and right cover engagement-receiving portions 35g are formed in the left and right upper inner side portions 35d, and the left and right cover engagement-receiving portions 35h and the left and right cover engagement-receiving portions 35j are formed in the left and right lower inner side portions 35f.

In FIGS. 5 and 9, the sub cover 51 integrally includes a pair of left and right cover engagement portions 51t, a pair of left and right cover engagement portions 51u, and a pair of left and right cover engagement portions 51v on the inner surface.

The left and right cover engagement portions 51t, the left and right cover engagement portions 51u, and the left and right cover engagement portions 51v are engaged with the left and right cover engagement-receiving portions the left and right cover engagement-receiving portions and the left and right cover engagement-receiving portions 35j, respectively.

Figure 10:
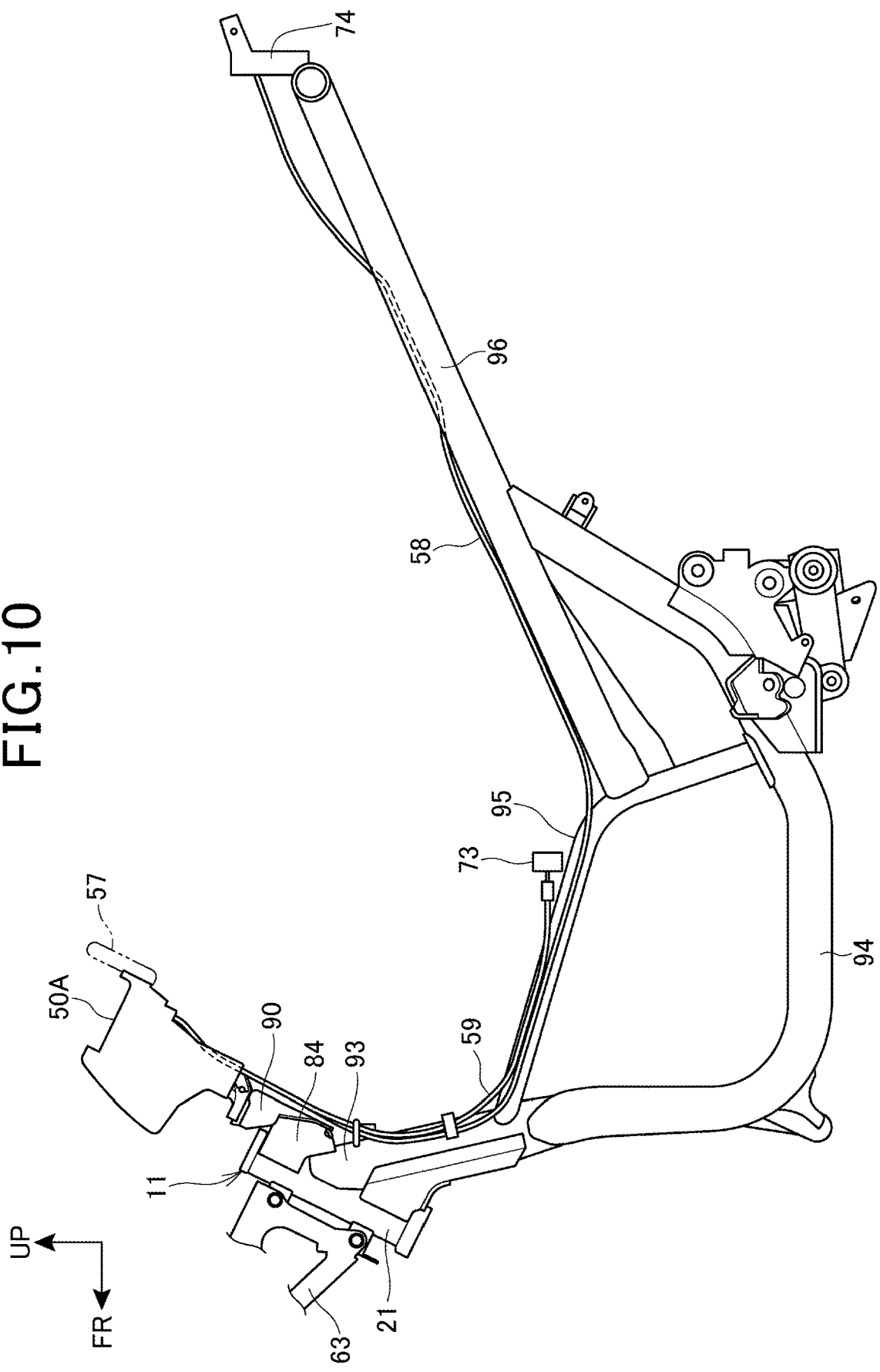
FIG. 10 is a left side view illustrating a routing state of a seat lock cable and a lid lock cable.
Figure 11:
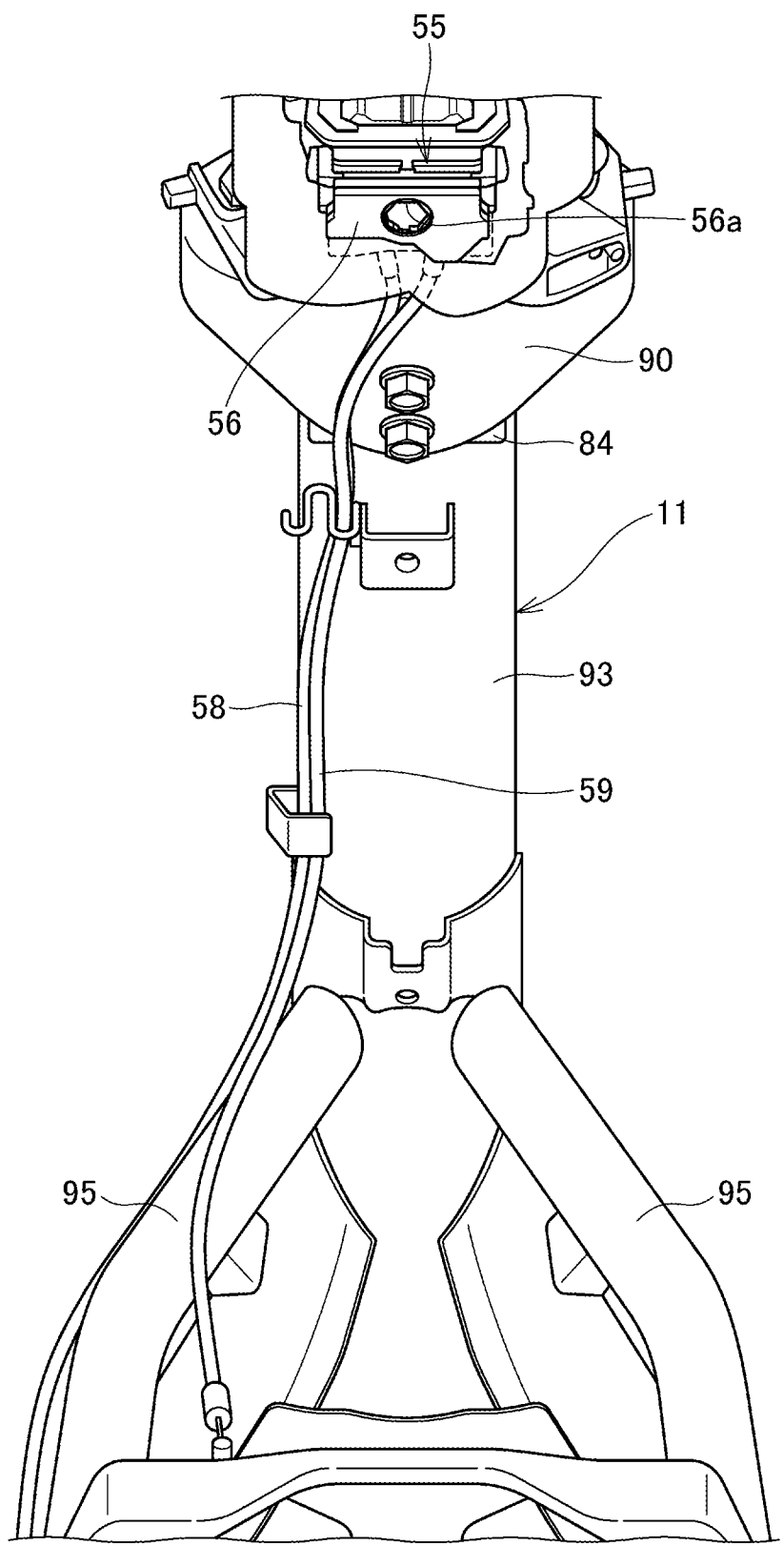
FIG. 11 is a perspective view illustrating the routing state of the seat lock cable and the lid lock cable.

FIG. 10 is a left side view illustrating a routing state of the seat lock cable 58 and a lid lock cable 59, and FIG. 11 is a perspective view illustrating the routing state of the seat lock cable 58 and the lid lock cable 59.

As illustrated in FIGS. 10 and 11, the vehicle body frame 11 includes the head pipe 21, a down frame 93, a pair of left and right lower frames 94, a pair of left and right upper frames 95, and a pair of left and right rear frames 96.

The down frame 93 extends downward and obliquely rearward from the head pipe 21. The left and right lower frames 94 extend downward and obliquely laterally from the left and right of a lower end of the down frame 93, are bent, and extend rearward, and rearward obliquely upward.

The left and right upper frames 95 extend rearward and obliquely downward from the down frame 93 above the connection between the down frame 93 and the left and right lower frames 94. The left and right rear frames 96 extend rearward and obliquely upward from rear portions of the left and right upper frames 95, and rear ends of the left and right lower frames 94 are connected to intermediate portions of the left and right rear frames 96 in the front-rear direction.

A reinforcing member 84 is mounted to the connection between the head pipe 21 and the down frame 93, and the smart lock module 50A is mounted to an upper portion of the reinforcing member 84 via a bracket 90.

As shown in FIGS. 6, 10, and 11, the seat lock cable 58 extends from a lower portion of the lid release unit 55 to the seat lock mechanism 74, and the lid lock cable 59 extends to the lid lock mechanism 73 of the fuel lid 72 (see FIG. 2).

Specifically, the seat lock cable 58 and the lid lock cable 59 extend downward from the lid release unit 55, behind the bracket 90 and the reinforcing member 84, and further extend downward, laterally from the rear of the down frame 93.

Then the seat lock cable 58 and the lid lock cable 59 extend from the down frame 93 to one (left) upper frame 95. Further, the seat lock cable 58 extends from the upper frame 95 to one (left) rear frame 96 and is connected to the seat lock mechanism 74 provided at a rear end of the rear frame 96. In addition, the lid lock cable 59 extends rearward above one (left) upper frame 95 and is connected to the lid lock mechanism 73.

As illustrated in FIGS. 2 and 5 to 7 above, the motorcycle 10 includes the smart lock module 50A that enables a start operation for the engine 27 and an unlocking operation for the handlebar 25 and enables unlocking of the seat 17 and the fuel lid 72, through the smart key system 50, and the front inner cover 35 disposed around the smart lock module 50A. The smart lock module includes the insertion portion 56a into which the emergency release key 57 that allows the seat 17 to be unlocked in an emergency is inserted, and the insertion portion 56a is located in the rear portion of the smart lock module 50A. Therefore, since the insertion portion 56a is located in the rear portion of the smart lock module accessibility to the insertion portion 56a can be improved as compared with the case where the insertion portion 56a is provided on the left or right side.

In the present embodiment, the sub cover 51 that is separate from the front inner cover 35 is provided so as to surround the smart lock module 50A, and disposed closer to the smart lock module 50A than the front inner cover 35 by being disposed so as to overlap the outer side of the front inner cover 35 when viewed from the seat 17 side (rear view illustrated in FIG. 3). The sub cover 51 covers the insertion portion 56a with the rear cover 60. Thus, the insertion portion 56a can be protected by the sub cover 51 while ensuring accessibility to the insertion portion 56a from the seat 17 side in an emergency.

In addition, in the present embodiment, the opening 51p that surrounds the insertion portion 56a is provided in the sub cover 51, the sub cover 51 includes the rear cover that is removable, the rear cover 60 closing the opening 51p and covering the insertion portion 56a, and the cut-away portion 60a that is operated when opening the rear cover 60 from the sub cover 51 is provided in the rear cover 60. Therefore, the cut-away portion 60a can be accessed without removing the large front inner cover 35 or sub cover 51, and the insertion portion 56a can be exposed to the outside for confirmation by removing the rear cover 60 without removing the sub cover 51.

In addition, in the present embodiment, the sub cover 51 is disposed in front of the seat 17 and has a shape protruding rearward at the placement location of the smart lock module 50A in the vehicle width direction. Therefore, since the smart lock module 50A is provided in the region in front of the seat 17 where the sub cover 51 protrudes rearward, the distance between the seat 17 and the insertion portion 56a can be shortened, and the emergency release key 57 can be inserted more easily.

In addition, in the present embodiment, the insertion portion 56a is oriented toward the rear of the vehicle. Therefore, since the insertion portion 56a is oriented toward the seat 17 side, the insertion portion 56a can be easily seen from the seat 17 side, and the seat 17 and the insertion portion 56a can be brought closer to each other than in the case where the insertion portion 56a is oriented outward in the vehicle width direction.

In addition, in the present embodiment, the sub cover 51 includes the pair of frame side portions 51m that protrude upward in the regions located on both sides of the smart lock module 50A. Therefore, the smart lock module 50A can be protected by the left and right frame side portions 51m, and the rigidity of the sub cover 51 can be improved by the frame side portions 51m.

Second Embodiment

Figure 12:
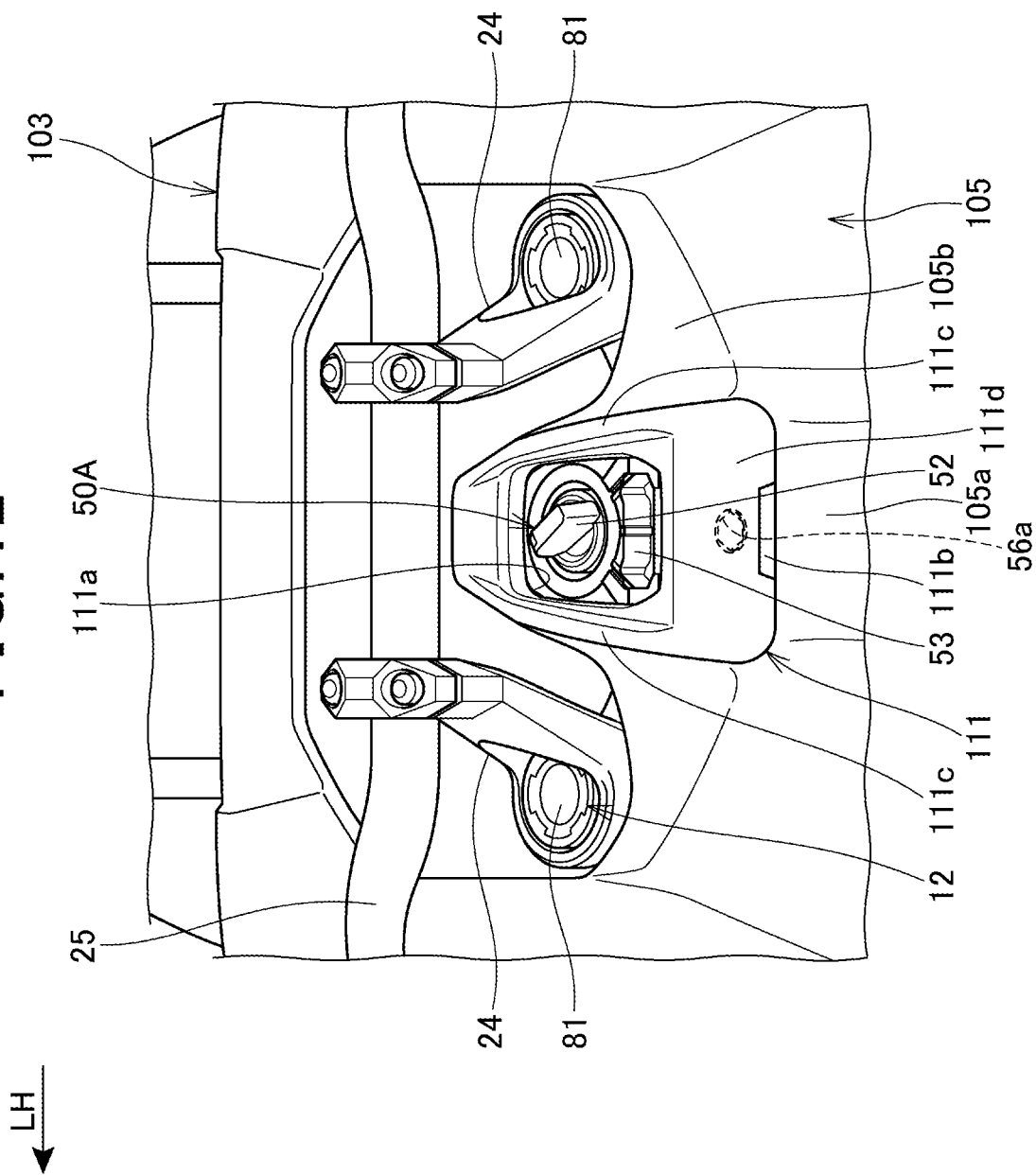
FIG. 12 is a perspective view illustrating the smart lock module and the surroundings thereof according to a second embodiment.

FIG. 12 is a perspective view illustrating the smart lock module 50A and the surroundings thereof according to a second embodiment.

In the second embodiment, the same components as those of the first embodiment are denoted with the same reference signs, and a detailed description thereof will be omitted.

In the second embodiment, a bezel portion 111 as an example of a sub cover is provided in place of the sub cover 51 of the first embodiment. The bezel portion 111 differs from the sub cover 51 of the first embodiment in that the opening 51p surrounding insertion portion 56a is omitted from the sub cover 51 of the first embodiment, and the portion covering the insertion portion 56a is integrally formed.

That is, a vehicle body cover 103 which covers the vehicle body frame 11 (see FIG. 10) includes a front inner cover 105 that covers the upper portion of the front fork 12 from behind and that is connected to the left and right rear edges of the front cover 34 (see FIG. 1).

The front inner cover 105 bulges in a manner protruding toward the rear of the vehicle so that the front inner cover 105 is positioned toward the rear of the vehicle as approaching a center portion 105a in the vehicle width direction from the outside in the vehicle width direction. The smart lock module 50A is disposed inside an upper portion (specifically, in front of the center portion 105a in the vehicle width direction) of the front inner cover 105.

The frame-shaped bezel portion 111 that surrounds the upper portion of the smart lock module 50A is disposed below the handlebar 25 and on an upper end of the front inner cover 105. The bezel portion 111 is separate from the front inner cover 105, and is removably mounted to an upper end of the center portion 105a of the front inner cover 105 in the vehicle width direction, more specifically, to a flat portion 105b that is formed integrally with the upper end of the front inner cover 105.

Specifically, the bezel portion 111 includes an engagement portion (not illustrated) that engages with an engagement-receiving portion (not illustrated) formed in the flat portion 105b, and is made removable by engaging the flat portion 105b.

The bezel portion 111 includes an opening 111a through which the upper portion of the smart lock module is exposed, a cut-away portion 111b that is formed at a rear end of a mating surface with the front inner cover 105, and a pair of left and right side ribs 111c that are provided so as to protrude upward at left and right edges.

The ignition knob 52 and the unlocking knob 53 are provided on the upper portion of the smart lock module 50A (specifically, the ignition switch unit 54 (see FIG. 14)), and are exposed through the opening 111a of the bezel portion 111.

The cut-away portion 111b serving as the operation portion of the bezel portion 111 is where a finger is hung when removing the bezel portion 111 from the front inner cover 105, and the bezel portion 111 can be easily removed from the front inner cover 105 by providing the cut-away portion 111b.

The side ribs 111c serving as left and right ribs are provided at left and right edges of the opening 111a so as to extend in the front-rear direction, increase the rigidity of the bezel portion 111, and laterally protect the ignition knob 52 and the unlocking knob 53. As described above, the bezel portion 111 also serves as a protective member that protects the smart lock module 50A.

A front portion of the bezel portion 111 is disposed between the left and right handlebar holders 24.

The left and right handlebar holders 24 become closer to the smart lock module 50A in the vehicle width direction toward the top of the left and right handlebar holders 24. Thus, the ignition knob 52 and the unlocking knob 53 are laterally protected by the left and right handlebar holders 24.

Figure 13:
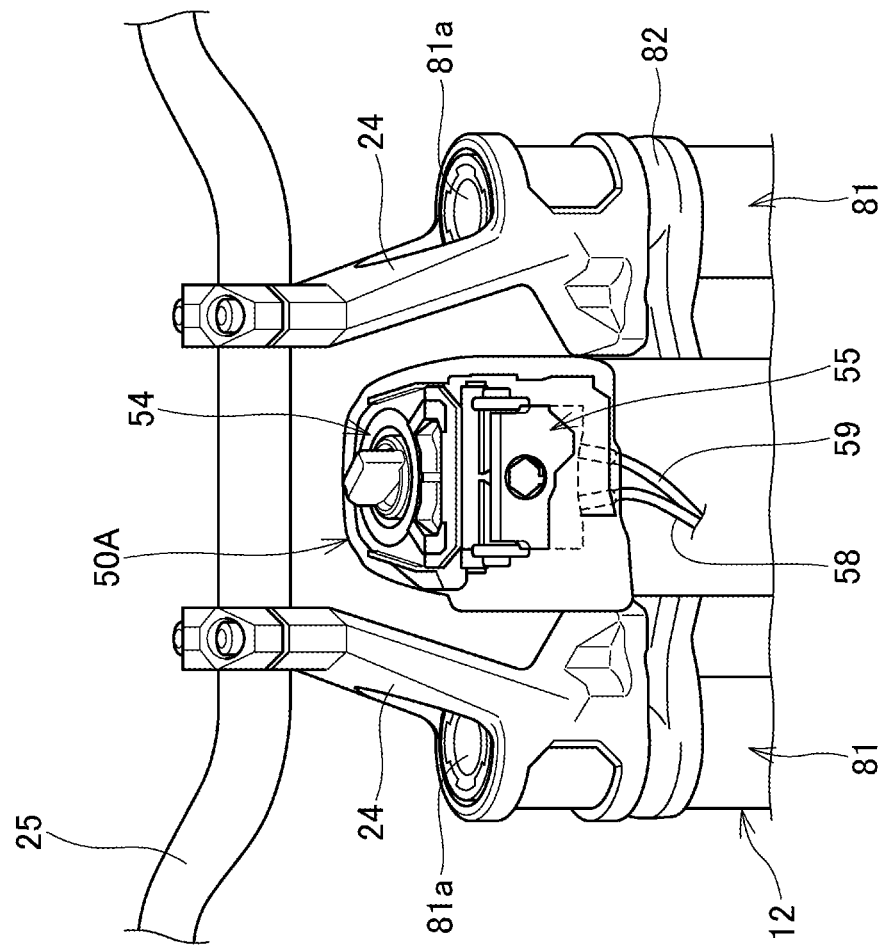
FIG. 13 is a rear view with a front inner cover and bezel portion removed from the state of FIG. 12.
Figure 14:
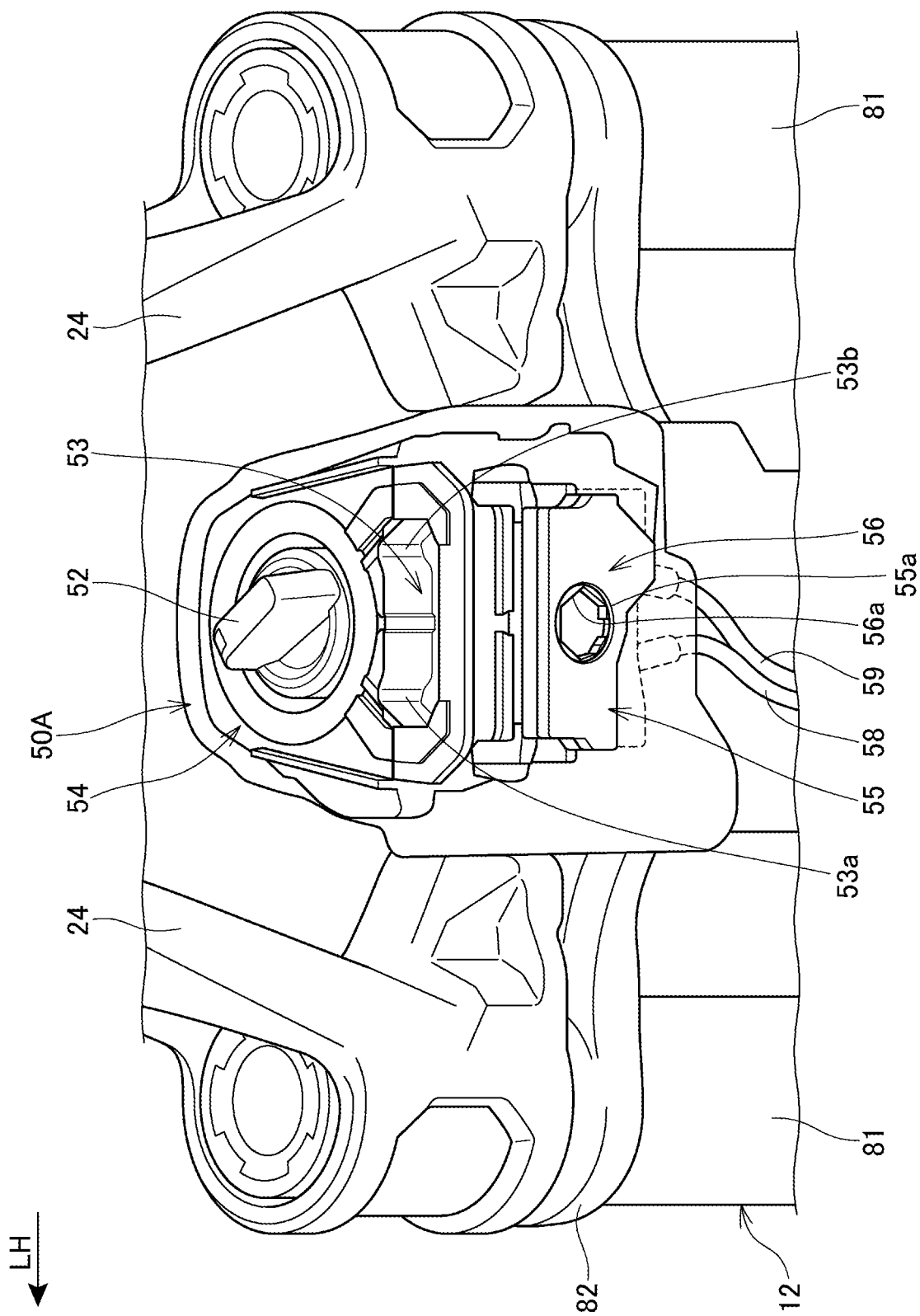
FIG. 14 is an enlarged perspective view of the smart lock module and the surroundings thereof in FIG. 13.

FIG. 13 is a rear view with the front inner cover 105 and bezel portion 111 removed from the state of FIG. 12. FIG. 14 is an enlarged perspective view of the smart lock module 50A and the surroundings thereof in FIG. 13.

As illustrated in FIG. 13, the smart lock module 50A is disposed between the handlebar 25 and the top bridge 82 and between the upper ends 81a of the left and right fork tubes 81 in the rear view. In addition, in the rear view, the smart lock module 50A is disposed further inward in the vehicle width direction than upper ends (which support the handlebar 25) of the left and right handlebar holders 24.

As illustrated in FIG. 12, the insertion portion 56a is normally covered with the bezel portion 111 mounted to the front inner cover 105, specifically, a rear wall 111d serving as a wall of bezel portion 111. The bezel portion 111 has a shape protruding rearward at the placement location of the smart lock module 50A in the vehicle width direction.

In FIGS. 12 and 14, the rear wall 111d is disposed so as to face the insertion portion 56a of the key cylinder 56. When the bezel portion 111 is removed from the front inner cover 105, the insertion portion 56a is easily visible, and the emergency release key 57 (see FIG. 7) can be inserted quickly, reliably, and easily while confirming the position of the insertion portion 56a.

Further, the conventional structure in which a magnet key provided to an emergency release key is attracted to an insertion slot at the back and moved is unnecessary for the emergency release key 57 of the present embodiment, and the emergency release key 57 can be simplified.

The above-described embodiments merely illustrate one aspect of the present invention, and can be arbitrarily modified and applied without departing from the spirit of the present invention.

The opening 51p is provided in the sub cover 51, and the rear cover 60 is removably mounted to the sub cover 51 so as to close the opening 51p, but the present invention is not limited thereto. For example, an opening through which the insertion portion 56a is exposed to the outside may be provided in the front inner cover 35, and a cover may be removably mounted to the front inner cover 35 so as to close the opening.

In addition, in the above embodiment, the sub cover 51 and the bezel portion 111 have a shape that protrudes rearward at the center in the vehicle width direction, but are not limited to this, and may have any shape as long as the sub cover 51 and the bezel portion 111 protrude rearward at the placement location of the smart lock module in the vehicle width direction.

The present invention is applicable not only to the motorcycle 10 but also to saddle-ride type vehicles, including those other than the motorcycle 10. Note that the saddle-ride type vehicles include all vehicles designed for sitting astride a vehicle body, including three-wheeled and four-wheeled vehicles classified as all-terrain vehicles (ATVs).

REFERENCE SIGNS LIST

10 Motorcycle (saddle-ride type vehicle)
17 Seat
25 Handlebar
27 Engine
35 Front inner cover (vehicle body cover)
50 Smart key system (electronic key authentication system)
50A Smart lock module
51 Sub cover
51g Center in vehicle width direction
51j Upper opening (opening)
51m Frame side portion (rib)
56a Insertion portion
57 Emergency release key
60 Rear cover (insertion portion cover)
60a Cut-away portion (operation portion)
72 Fuel lid
105 Front inner cover (vehicle body cover)
111 Bezel portion (sub cover)
111c Side rib (rib)

The invention claimed is:

1. A saddle-ride type vehicle comprising:
a smart lock module that enables a start operation for an engine and an unlocking operation for a handlebar and enables unlocking of a seat and a fuel lid, through an electronic key authentication system; and a vehicle body cover disposed around the smart lock module, wherein
the smart lock module includes an insertion portion into which an emergency release key that allows the seat to be unlocked in an emergency is inserted, and
the insertion portion is located in the smart lock module to a vehicle rear side.

2. The saddle-ride type vehicle according to claim 1, further comprising a sub cover that is provided separately from the vehicle body cover so as to surround the smart lock module and disposed closer to the smart lock module than the vehicle body cover when viewed from the seat side, wherein
the sub covers the insertion portion.

3. The saddle-ride type vehicle according to claim 2, wherein
an opening that surrounds the insertion portion is provided in the sub cover,
the sub cover includes an insertion portion cover that is removable, the insertion portion cover closing the opening and covering the insertion portion, and
an operation portion that is operated when opening the insertion portion cover from the sub cover is provided in the insertion portion cover.

4. The saddle-ride type vehicle according to claim 3, wherein
the sub cover is disposed in front of the seat and has a shape protruding rearward at a placement location of the smart lock module in a vehicle width direction.

5. The saddle-ride type vehicle according to claim 3, wherein
the insertion portion is oriented toward the rear of the vehicle.

6. The saddle-ride type vehicle according to claim 3, wherein
the sub cover includes a pair of ribs that protrude upward in regions located on both sides of the smart lock module.

7. The saddle-ride type vehicle according to claim 2, wherein
the sub cover is disposed in front of the seat and has a shape protruding rearward at a placement location of the smart lock module in a vehicle width direction.

8. The saddle-ride type vehicle according to claim 7, wherein
the insertion portion is oriented toward the rear of the vehicle.

9. The saddle-ride type vehicle according to claim 7, wherein
the sub cover includes a pair of ribs that protrude upward in regions located on both sides of the smart lock module.

10. The saddle-ride type vehicle according to claim 2, wherein
the insertion portion is oriented toward the rear of the vehicle.

11. The saddle-ride type vehicle according to claim 10, wherein
the sub cover includes a pair of ribs that protrude upward in regions located on both sides of the smart lock module.

12. The saddle-ride type vehicle according to claim 2, wherein
the sub cover includes a pair of ribs that protrude upward in regions located on both sides of the smart lock module.

* * * * *